United States Patent
Murata et al.

(10) Patent No.: US 6,756,152 B2
(45) Date of Patent: Jun. 29, 2004

(54) ELECTRODE FOR ALKALINE STORAGE BATTERY AND METHOD OF MANUFACTURING THE SAME

(75) Inventors: Tetsuyuki Murata, Naruto (JP); Tadashi Ise, Itano-gun (JP); Teruhiko Imoto, Itano-gun (JP); Yasuhiko Ikeda, Itano-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 300 days.

(21) Appl. No.: 09/813,967

(22) Filed: Mar. 22, 2001

(65) Prior Publication Data

US 2001/0036576 A1 Nov. 1, 2001

(30) Foreign Application Priority Data

Mar. 22, 2000 (JP) ..................................... P. 2000-080248

(51) Int. Cl.$^7$ ................................................. H01M 4/62
(52) U.S. Cl. ........................ 429/217; 429/137; 429/246; 429/217; 429/221; 429/231.95; 429/241; 429/337; 29/623.5; 29/218.2
(58) Field of Search ................................. 429/217, 221, 429/231.95, 241, 337, 218, 194, 137, 246, 209; 29/623.5, 218.2

(56) References Cited

U.S. PATENT DOCUMENTS 5,750,287 A * 5/1998 Kinoshita et al. ........... 429/221

* cited by examiner

*Primary Examiner*—Randy Gulakowski
*Assistant Examiner*—Gentle E. Winter
(74) *Attorney, Agent, or Firm*—Nixon & Vanderhye P.C.

(57) ABSTRACT

An electrode for the alkaline storage battery includes a binding agent containing thermoplastic xylene-formaldehyde resin. Since the thermoplastic xylene-formaldehyde resin is non-aqueous, it is not dissolved into moisture in the air or the alkaline electrolyte within the battery. The electrode is prepared by immersing an active-material-applied or -filled electrode substrate in a solution in which the thermoplastic xylene-formaldehyde resin is dissolved; immersing it in an emulsion of the thermoplastic xylene-formaldehyde resin with an emulsifier; or applying or filling a slurry of the active material with an emulsion of the thermoplastic xylene-formaldehyde resin to or in the electrode substrate. The electrode retains the active material using a binding agent which has excellent adhesion to the active material and imparts high binding capacity of the active materials with one another.

7 Claims, No Drawings

ELECTRODE FOR ALKALINE STORAGE BATTERY AND METHOD OF MANUFACTURING THE SAME

BACKGROUND OF THE INVENTION

1. Field of the Invention

This invention relates to an electrode for an alkaline storage battery such as a nickel-metal hydride battery and nickel-cadmium battery, and more particularly to an improvement of the electrode capable of preventing removal of an active material.

2. Description of the Related Art

In recent years, in order to realize a high-energy alkaline storage battery, a nickel-metal hydride (Ni—MH) battery using a hydrogen storage alloy electrode has attracted considerable attention and put into practice. Previously known hydrogen storage alloys used for the Ni—MH battery are a Ti—Ni alloy, La(or Mm (Misch metal: compound of a Ce group rare earth element))—Ni alloy, etc. The electrode using the hydrogen storage alloy can be manufactured by the process of adding a binding agent to the hydrogen storage-alloy to make an active material paste and filling an electrode plate of e.g. a punching metal with the active material paste thus acquired.

In this case, inclusion of the binding agent in the active material paste intends to increase the strength of the electrode, thereby preventing the active material from removed from the electrode and the surface of the electrode from cracking. Otherwise, application of the binding agent to the surface of the electrode filled with the active material paste intends to increase the strength of the electrode more greatly, thereby preventing the active material from removed from the electrode and the surface of the electrode from cracking.

Meanwhile, the binding agent to be added to the active material paste or applied to the electrode surface is an aqueous binder such as poly(ethylene oxide) (PEO) or polyvinylpyrrolidone (PVP), an aqueous emulsion elastomer such as styrene butadiene rubber (SBR), or phenol resin.

However, the binding capacity of these binders is low. This has presented a problem that the active material is removed during the process of manufacturing the electrode or removed within the electrode to shorten the cycle life.

The reason why such a phenomenon occurs is not clear. However, this is probably because the binding agent such as poly(ethylene oxide) (PEO) or polyvinylpyrrolidone (PVP) is dissolved due to water in the air and dissolved into an alkaline electrolyte within the battery so that the binding capacity between the active materials is reduced, thereby leading to removal of the active material. This is also probably because the binding capacity of the aqueous emulsion elastomer such as styrene butadiene rubber (SBR) having a rubber property is low so that the active materials are not bound to one another, thereby leading to removal of the active material. Further, this is probably because the phenol resin which is thermosetting does not have sufficient adhesion to the active materials so that the active materials are not sufficiently bound with one another, thereby leading to removal of the active material.

SUMMARY OF THE INVENTION

This invention has been accomplished in order to overcome the inconvenience as described above.

An object of this invention is to provide an alkaline storage battery having an excellent cycle life which is provided with an electrode free from removal of an active material, the electrode being made using a binding agent which is excellent adhesion to the active material and gives a high binding capacity of the active materials with one another.

In order to attain the above object, the electrode for the alkaline storage battery according to this invention includes a binding agent containing thermoplastic xylene-formaldehyde resin.

Since the thermoplastic xylene-formaldehyde resin is non-aqueous, it will be not dissolved into water in the air or the alkaline electrolyte within the battery. For this reason, the electrode using the thermoplastic xylene-formaldehyde resin as the binding agent can prevent removal of the active material during the manufacturing process of the battery or within the battery. Thus, an alkaline storage battery having an excellent cycle life can be obtained.

The thermoplastic xylene-formaldehyde resin softens up by the heat treatment in a drying step and thereafter solidifies in resin so that it can be given a high adhesion to the active material. This increases the binding capacity of the active materials to one another, thereby preventing removal of the active material. Accordingly, the alkaline storage battery with an excellent life can be obtained. Further, since the thermoplastic xylene-formaldehyde is thermoplastic, it softens up by the heat treatment to adhere to the active materials. Therefore, after having dried, it fixes the active materials to one another strongly. This prevents removal of the active material during the process of manufacturing the electrode which will be performed later and within the battery.

In this case, alkylphenyl-modified xylene-formaldehyde resin is non-soluble and thermoplastic, and has a property that it softens up by addition of heat and solidifies in resin as the temperature decreases. Therefore, the thermoplastic xylene-formaldehyde resin may be preferably the alkylphenyl-modified xylene-formaldehyde resin. Further, the particle of the active material having a larger particle diameter has a tendency of being easily removed from the electrode. Therefore, the thermoplastic xylene-formaldehyde resin having an excellent binding capacity can provide a sufficient effect of preventing removal of the active material for the electrode using the hydrogen storage alloy having a large average particle diameter.

Since the thermoplastic xylene-formaldehyde resin is non-soluble, a particular contrivance is required to manufacture the electrode using such a binding agent.

To this end, the method of manufacturing an alkaline storage battery according to this invention comprises the steps of: mixing an active material and an aqueous binder or aqueous emulsion binder to create active material slurry; applying or filling the active material slurry to or in an electrode substrate and drying the electrode substrate; and immersing the electrode substrate in a solution with thermoplastic xylene-formaldehyde resin dissolved in organic solvent and drying it.

Further, the method of manufacturing an alkaline storage battery according to this invention comprises the steps of: mixing an active material and an aqueous binder or aqueous agent to create active material slurry; applying or filling the active material slurry to or in an electrode substrate and drying the electrode substrate; emulsifying a solution of thermoplastic xylene-formaldehyde resin dissolved in an organic solvent to create an emulsion of the thermoplastic xylene-formaldehyde resin; and immersing the electrode substrate in the emulsion of the thermoplastic xylene-formaldehyde resin and drying it.

Further, the method of manufacturing an alkaline storage battery according to this invention comprises the steps of: emulsifying a solution of thermoplastic xylene-formaldehyde resin dissolved in an organic solvent to create an emulsion of the thermoplastic xylene-formaldehyde resin; mixing an active material and the emulsion of the thermoplastic xylene-formaldehyde resin to create active material slurry; and applying or filling the active material slurry to or in an electrode substrate and drying the electrode substrate.

In this way, the removal of the active material during the process of manufacturing the electrode or within the battery can be prevented by any of the techniques of immersing the active-material-applied or -filled electrode substrate in the solution of the thermoplastic xylene-formaldehyde resin dissolved; immersing it in the emulsion of the thermoplastic xylene-formaldehyde resin with an emulsifier; and applying or filling the active material slurry with the emulsion of the thermoplastic xylene-formaldehyde resin to or in the electrode substrate. Thus, the alkaline storage battery with an excellent cycle life can be obtained.

Incidentally, it should be noted that the active material preferably has a particle diameter within a range of 20–100 µm.

Further, the thermoplastic xylene-formaldehyde resin may be preferably the alkylphenyl-modified xylene-formaldehyde resin.

Further, it should be noted that the active material is a hydrogen storage alloy capable of reversibly making electrochemical absorption or desorption of hydrogen.

Further, it should be noted that a layer of the thermoplastic xylene-formaldehyde resin covers the outside of the active material layer.

Further, it should be noted that the thermoplastic xylene-formaldehyde resin is contained in the active material layer.

Further, it should be noted that the thermoplastic xylene-formaldehyde resin is contained in a boundary between the electrode substrate and active material layer.

The above and other objects and features of this invention will be apparent from the following description.

DESCRIPTION OF THE PREFERRED EMBODIMENTS

An explanation will be given the embodiment in the case where this invention has been applied to a hydrogen storage alloy electrode.
1. Creation of a Hydrogen Storage Alloy The metallic elements of Mm (misch metal), Ni, Co, Al and Mn which are commercially available were weighed and mixed to provide a composition represented by $MmNi_{3.4}Co_{0.8}Al_{0.2}Mn_{0.6}$. The composite thus created was cast and dissolved in a high frequency dissolving furnace, and cooled to create an ingot of a hydrogen storage alloy. After the ingot of the hydrogen storage alloy had been heat-treated for 10 hours at 1000° C., it was mechanically crushed in an atmosphere of nitrogen to provide an average particle diameter of 60 µm so that a particle of the hydrogen storage alloy was created.
2. Preparation of a Binding Agent Solution Alkylphenyl-modified xylene-formaldehyde resin (Nikanol HP-100 available from Mitsubishi Gas Chemical Co., Inc.) was dissolved in ethylcyclohexane to prepare a solution of the alkylphenyl-modified xylene-formaldehyde resin by 10% by mass. The solution of the alkylphenyl-modified xylene-formaldehyde was mixed with pure water and a surface active agent by 5% by mass (Tween 20 available from Atras Chem. Ind. Inc.) to prepare an emulsion of the alkylphenyl-modified xylene-formaldehyde resin by 10% by mass.
3. Creation of a Hydrogen Storage Alloy Electrode

EXAMPLE 1

The particle of the hydrogen storage alloy created in the manner as described above was kneaded with a solution (10% by mass) of poly (ethylene oxide) (PEO) by 5% by mass and a solution (10% by mass) of poly (vinyl alcohol) by 5% by mass, thereby creating an active material slurry. The active material slurry was applied to both surfaces of an electrode substrate (made of steel plated with nickel), and dried to create an active-material applied substrate.

The active-material applied substrate thus created was immersed in a solution (10% by mass) of the alkylphenyl-modified xylene-formaldehyde resin prepared as described above, and dried. Thereafter, it was pressurized and cut into a prescribed shape to make a hydrogen storage alloy electrode (hydrogen storage alloy a according to Example 1).

EXAMPLE 2

After the active material applied substrate had been created like Example 1, it was immersed in the emulsion (10% by mass) of the alkylphenyl-modified xylene-formaldehyde resin prepared as described above, and dried. Thereafter, it was pressurized and cut into a prescribed shape to make a hydrogen storage alloy electrode (hydrogen storage alloy b according to Example 2).

EXAMPLE 3

The particle of the hydrogen storage alloy created in the manner as described above was kneaded with a solution (10% by mass) of poly (ethylene oxide) (PEO) by 5% by mass, a solution (10% by mass) of poly (vinyl alcohol) by 5% by mass and the emulsion (10% by mass) of the alkylphenyl-modified xylene-formaldehyde resin, thereby creating an active material slurry. The active material slurry was applied to both surfaces of an electrode substrate of a punching metal (steel plated with nickel), and dried to create an active-material applied substrate. Thereafter, it was pressurized and cut into a prescribed shape to make a hydrogen storage alloy electrode (hydrogen storage alloy c according to Example 3).

EXAMPLE 4

After the solution (10% by mass) of the alkylphenyl-modified xylene-formaldehyde resin prepared as described above had been applied to both surfaces of an electrode substrate of a punching metal (steel plated with nickel), and dried to create an electrode substrate. Thereafter, the particle of the hydrogen storage alloy created in the manner as described above was kneaded with a solution (10% by mass) of poly (ethylene oxide) (PEO) by 5% by mass and a solution (10%by mass) of poly (vinyl alcohol) by 5% by mass, thereby creating an active material slurry. The active material slurry was applied to both surfaces of the electrode substrate of a punching metal (steel plated with nickel). Thereafter, it was dried, pressurized and cut into a prescribed shape to make a hydrogen storage alloy electrode (hydrogen storage alloy d according to Example 4).

EXAMPLE 5

After the emulsion (10% by mass) of the alkylphenyl-modified xylene-formaldehyde resin prepared as described above had been applied to both surfaces of an electrode substrate of a punching metal (steel plated with nickel), and dried to create an electrode substrate. Thereafter, the particle of the hydrogen storage alloy created in the manner as described above was kneaded with a solution (10% by mass) of poly (ethylene oxide) (PEO) by 5% by mass and a solution (10% by mass) of poly (vinyl alcohol) by 5% by mass, thereby creating an active material slurry. The active material slurry was applied to both surfaces of the electrode substrate of a punching metal (steel plated with nickel). Thereafter, it was dried, pressurized and cut into a prescribed shape to make a hydrogen storage alloy electrode (hydrogen alloy e according to Example 5).

In such configurations, the hydrogen storage alloy electrodes each having xylene-formaldehyde resin layer at the boundary between the electrode substrate and the active material layer were completed.

COMPARATIVE EXAMPLE 1

After the active material applied substrate had been created like Example 1, it was immersed in a solution (10% by mass) of thermosetting phenol resin, and dried. Thereafter, it was pressurized and cut into a prescribed shape to make a hydrogen storage alloy electrode (hydrogen storage alloy x according to Comparative Example 1).

COMPARATIVE EXAMPLE 2

After the active material applied substrate had been created like Example 1, it was immersed in a solution (10% by mass) of styrene butadiene rubber (SBR), and dried. Thereafter, it was pressurized and cut into a prescribed shape to make a hydrogen storage alloy electrode (hydrogen storage alloy y according to Comparative Example 2).

COMPARATIVE EXAMPLE 3

The active material applied substrate had been created like Example 1 was dried as it was. Thereafter, it was pressurized and cut into a prescribed shape to make a hydrogen storage alloy electrode (hydrogen storage alloy z according to Comparative Example 3).

4. Measurement of the Hydrogen Storage Alloy Electrode

For the hydrogen storage alloy electrodes a to e according to Examples 1 to 5 and the hydrogen storage alloy electrode x to z according to Comparative Examples 1 to 3, immediately after they had been created, cuts in a grid pattern were made on the active material applied surface of each of them using a cutter knife. Thereafter, an adhesive tape is applied on the active material applied surface of each electrode and removed. In this case, for each electrode, the number of the active materials deposited on the tape was measured. On the basis of the measurement result, the rate of removal of the active material was acquired. The result is shown in Table 1.

TABLE 1

| Kind of Electrode | Kind of Binding Agent | Location of Immersion and Application | Removal Rate immediately after Manufactured |
|---|---|---|---|
| A | Xylene-formaldehyde resin | Electrode | 38% |
| B | Emulsion of Xylene-formaldehyde resin | Electrode | 41% |
| C | Emulsion of Xylene-formaldehyde resin | Into Slurry | 37% |
| D | Xylene-formaldehyde resin | Substrate Surface | 41% |
| E | Emulsion of Xylene-formaldehyde resin | Substrate Surface | 43% |
| X | Thermosetting Phenol Resin | Electrode | 79% |
| Y | SBR Solution | Electrode | 77% |
| Z | Only Soluble Binding Agent | No Immersion, Application | 92% |

As seen from Table 1, the hydrogen storage alloy electrode z immediately after created, which was created by adding only poly (ethylene oxide) (PEO) and poly (vinyl alcohol) (PVA) (both are usual binding agents) into the active material slurry, provides a highest rate of removal of the active material. On the other hand, the hydrogen storage alloy electrodes x and y immediately after created, which were created by not only adding the usual binding agent to the active material but also immersing the substrate in the thermosetting phenol resin solution, and immersing the substrate in the styrene butadiene rubber (SBR) solution, respectively, provide relatively reduced rates of removal of the active material. It can be seen that their rates of removal of the active material have been improved, but its degree is small.

On the other hand, the hydrogen storage alloy electrodes a, b, c, d and e immediately after created, which were created by not only adding the usual binding agent to the active material but also immersing the substrate in the xylene-formaldehyde resin solution, immersing the substrate in the emulsion of the xylene-formaldehyde resin and adding the emulsion of the xylene-formaldehyde resin to the active material slurry, respectively, provide greatly reduced rates of removal of the active material. It can be seen that their rates of removal of the active material have been improved greatly.

Next, the hydrogen storage alloy electrodes a to e according to Examples 1 to 5 and the hydrogen storage alloy electrode x to z according to Comparative Examples 1 to 3 were left in the air for 30 days at 60° C. Thereafter, an adhesive tape is applied on the active material applied surface of each electrode and removed. In this case, for each electrode, the number of the active materials deposited on the tape was measured. On the basis of the measurement result, the rate of removal of the active material was acquired. The result is shown in Table 2.

TABLE 2

| Kind of Electrode | Kind of Binding Agent | Location of Immersion and Application | Removal Rate after Left for 30 days at 60° C. |
|---|---|---|---|
| a | Xylene-formaldehyde resin | Electrode | 40% |
| b | Emulsion of Xylene-formaldehyde resin | Electrode | 42% |
| c | Emulsion of Xylene-formaldehyde resin | Into Slurry | 38% |
| d | Xylene-formaldehyde resin | Substrate Surface | 44% |
| e | Emulsion of Xylene-formaldehyde resin | Substrate Surface | 45% |
| x | Thermosetting Phenol Resin | Electrode | 88% |
| y | SBR Solution | Electrode | 85% |
| z | Only Soluble Binding Agent | No Immersion, Application | 100% |

As seen from Table 2, the hydrogen storage alloy electrode z left for 30 days at a high temperature (60° C.), which was created by adding only poly (ethylene oxide) (PEO) and poly (vinyl alcohol) (PVA) (both are usual binding agents) into the active material slurry, provides a rate of removal of the active material increased to 100%. On the other hand, the hydrogen storage alloy electrodes x and y left for 30 days at a high temperature (60° C.), which were created by not only adding the usual binding agent to the active material but also immersing the substrate in the thermosetting phenol resin solution, and immersing the substrate in the styrene butadiene rubber (SBR) solution, respectively, also provide relatively increased rates of removal of the active material.

On the other hand, the hydrogen storage alloy electrodes a, b, c, d and e left for 30 days at a high temperature (60° C.), which were created by not only adding the usual binding agent to the active material but also immersing the substrate in the xylene-formaldehyde resin solution, immersing the substrate in the emulsion of the xylene-formaldehyde resin and adding the emulsion of the xylene-formaldehyde resin to the active material slurry, respectively, maintain a high binding capacity and hence provide rates of removal of the active material, which have not almost been increased.

5. Creation of Ni—MH Storage Battery

Each of the hydrogen storage alloys according to Examples 1 to 5 and Comparative Examples 1 to 3 created in the manner described above, a known non-sintered nickel electrode and a separator of alkali-resistant nylon non-woven cloth are combined and inserted into a rectangular metallic outer case. In this case, the active material of the outermost hydrogen storage alloy electrode, which is in contact with the metallic outer case, was cut away so that the electrode substrate is exposed. Thereafter, the electrolyte of a solution of potassium hydroxide (KOH) by 30% by weight is injected into each of the outer metallic cases. The outer metallic cases were hermetically sealed to make rectangular Ni—MH storage batteries each having a theoretical capacity of 1350 mAh.

The Ni—MH storage battery using the hydrogen storage alloy electrode a according to Example 1 is referred to battery A. The Ni—MH storage battery using the hydrogen storage alloy electrode b according to Example 2 is referred to battery B. The Ni—MH storage battery using the hydrogen storage alloy electrode c according to Example 3 is referred to battery C. The Ni—MH storage battery using the hydrogen storage alloy electrode d according to Example 4 is referred to battery C. The Ni—MH storage battery using the hydrogen storage alloy electrode e according to Example 5 is referred to battery C. The Ni—MH storage battery using the hydrogen storage alloy electrode x according to Comparative Example 1 is referred to battery X. The Ni—MH storage battery using the hydrogen storage alloy electrode y according to Comparative Example 2 is referred to battery Y. The Ni—MH storage battery using the hydrogen storage alloy electrode z according to Comparative Example 3 is referred to battery Z.

6. Cycle Characteristic Test

Each of the batteries A, B, C, D, E, X, Y and Z thus manufactured was subjected to the following charging/discharging cycle test. First, each of them was charged with a charging current of 135 mA (1.0 C) at room temperature for 16 hours and subsequently left as it was for one hour. Thereafter, each battery was discharged with a discharging current of 270 mA (0.2 C) until the terminating voltage becomes 1.0 V, and subsequently as it was for one hour. Such a charging/discharging cycle was repeated three times so that each of the batteries A, B, C, D, E, X, Y and Z was activated.

Next, each of the batteries A, B, C, D, E, X, Y and Z thus activated was charged with an charging current of 1350 mA (1 C) at room temperature (25° C.) until the voltage was lower by a prescribed value than a peak value of the battery voltage at the end of charging (-ΔV system), and subsequently left as it was for one hour. Thereafter, the battery was discharged with a discharging current of 1350 mA (1 C) until the terminating voltage become 1.0 V and subsequently left as it was for one hour. Such a charging/discharging cycle was repeated, and the number of cycles when the battery capacity reaches 810 mAh (60% of the battery capacity) or lower was determined as the cycle life of the battery at issue. The result is shown in Table 3.

TABLE 3

| Kind of Electrode | Kind of Binding Agent | Location of Immersion and Application | Cycle Life (Number of Times) |
|---|---|---|---|
| A | Xylene-formaldehyde resin | Electrode | 685 |
| B | Emulsion of Xylene-formaldehyde resin | Electrode | 672 |
| C | Emulsion of Xylene-formaldehyde resin | Into Slurry | 693 |
| D | Xylene-formaldehyde resin | Substrate Surface | 679 |
| E | Emulsion of Xylene-formaldehyde resin | Substrate Surface | 663 |
| X | Thermosetting Phenol Resin | Electrode | 476 |
| Y | SBR Solution | Electrode | 451 |
| Z | Only Soluble | No | 417 |

TABLE 3-continued

| Kind of Electrode | Kind of Binding Agent | Location of Immersion and Application | Cycle Life (Number of Times) |
|---|---|---|---|
| | Binding Agent | Immersion, Application | |

As apparent from Table 3, the hydrogen storage alloy electrode z, which was created by adding only poly(ethylene oxide) (PEO) and poly (vinyl alcohol) (PVA) (both are the usual binding agent) into the active material slurry, provides the shortest charging/discharging life.

Further, the hydrogen storage alloy electrodes x and y, which were created by not only adding the usual binding agent to the active material but also immersing the substrate in the thermosetting phenol resin solution, and immersing the substrate in the styrene butadiene rubber (SBR) solution, respectively, provide the second shortest charging/discharging lives. Therefore, it can be seen that their charging/discharging cycle life has not been improved sufficiently.

On the other hand, the hydrogen storage alloy electrodes a, b, c and d, e, which were created by not only adding the usual binding agent to the active material but also immersing the substrate in the xylene-formaldehyde resin solution, immersing the substrate in the emulsion of the xylene-formaldehyde resin and adding the emulsion of the xylene-formaldehyde resin to the active material slurry, respectively, all provide long charging/discharging cycle lives. Therefore, it can be seen that their charging/discharging cycle life has been improved greatly.

In view of the results shown in Tables 1 to 3, the following can be guessed.

Since the thermosetting phenol resin is thermosetting, it cannot give sufficient adhesion to the active material so that the active materials cannot be sufficiently bound with one another. Therefore, immediately after the electrode has been created, removal of the active material occurs. The electrode cannot also maintain the binding capacity in preservation at a high temperature. As a result, the battery using this electrode cannot improve the charging/discharging life.

Further, since the styrene butadiene rubber (SBR) has rubber property, it cannot strong binding capacity for the active material so that the active materials cannot be sufficiently bound with one another. Therefore, immediately after the electrode has been created, removal of the active material occurs. The electrode cannot also maintain the binding capacity in preservation at a high temperature. As a result, the battery using this electrode could not improve the charging/discharging life.

On the other hand, in accordance with this invention, in addition to adding the usual binding agent to the active material, when the hydrogen storage alloy electrode is immersed in the xylene-formaldehyde resin solution, the electrode is immersed in the emulsion of the xylene-formaldehyde resin, or the emulsion of the xylene-formaldehyde resin is added to the active material slurry, all provide long charging/discharging cycle lives, the thermosetting xylene-formaldehyde resin which is very non-soluble will not be dissolved in the water content in the air or alkaline electrolyte within the battery. Therefore, immediately after the electrode has been created, removal of the active material does not occur. The electrode can maintain the sufficient binding capacity in preservation at a high temperature. As a result, the battery using this electrode could greatly improve the charging/discharging life.

Incidentally, in the respective embodiments described above, although this invention was applied to the hydrogen storage alloy electrode, it is apparent that this invention can be applied to various kinds of electrodes such as a nickel electrode or cadmium electrode.

What is claimed is:

1. An electrode for an alkaline storage battery comprising:

an electrode substrate; and an active material layer formed on the electrode substrate containing hydrogen storage alloy particles and thermoplastic xylene-formaldehyde resin, wherein the thermoplastic xylene-formaldehyde resin binds the hydrogen storage alloy particles to each other, or binds the hydrogen storage alloy particles with the substrate.

2. An electrode for an alkaline storage battery according to claim 1, wherein said thermoplastic xylene-formaldehyde resin is alkylphenyl-modified xylene-formaldehyde resin.

3. An electrode for an alkaline storage battery according to claim 1, wherein said hydrogen storage alloy particles have a particle diameter within a range of 20–100 $\mu$m.

4. An electrode for an alkaline storage battery according to claim 1, wherein said active material is a hydrogen absorbing metal alloy capable of reversibly making electrochemical absorption or desorption of hydrogen.

5. An electrode for an alkaline storage battery according to claim 1, wherein a layer of said thermoplastic xylene-formaldehyde resin covers the outside of said active material layer.

6. An electrode for an alkaline storage battery according to claim 1, wherein said thermoplastic xylene-formaldehyde resin is contained in a boundary between said active material layer and said electrode substrate.

7. An electrode for an alkaline storage battery according to claim 1, wherein said thermoplastic xylene-formaldehyde resin is contained in said active material layer.

* * * * *